(12) United States Patent
Tatge et al.

(10) Patent No.: US 7,840,475 B2
(45) Date of Patent: Nov. 23, 2010

(54) METHODS AND SYSTEMS FOR PURCHASE OF COMMODITIES

(75) Inventors: Jason G Tatge, Lenexa, KS (US); Daniel Scott Fritsch, Chapel Hill, NC (US)

(73) Assignee: Farms Technology, LLC, Overland Park, KS (US)

( * ) Notice: Subject to any disclaimer, the term of this patent is extended or adjusted under 35 U.S.C. 154(b) by 0 days.

(21) Appl. No.: 10/209,994

(22) Filed: Aug. 1, 2002

(65) Prior Publication Data

US 2004/0024648 A1 Feb. 5, 2004

(51) Int. Cl.
*G06Q 40/00* (2006.01)
(52) U.S. Cl. .......................................... 705/37; 705/26
(58) Field of Classification Search ................... 705/26, 705/27, 37, 28, 29
See application file for complete search history.

(56) References Cited

U.S. PATENT DOCUMENTS

| | | | |
|---|---|---|---|
| 5,063,507 A | 11/1991 | Lindsey et al. | |
| 5,884,286 A | 3/1999 | Daughtery, III | 705/36 |
| 5,970,479 A * | 10/1999 | Shepherd | 705/37 |
| 6,317,728 B1 | 11/2001 | Kane | 705/37 |
| 6,338,050 B1 | 1/2002 | Conklin et al. | 705/80 |
| 6,584,451 B1 * | 6/2003 | Shoham et al. | 705/37 |
| 6,598,027 B1 * | 7/2003 | Breen et al. | 705/26 |
| 2001/0032162 A1 | 10/2001 | Alsberg et al. | 705/37 |
| 2001/0032165 A1 | 10/2001 | Friend et al. | 705/37 |
| 2001/0034663 A1 | 10/2001 | Teveler et al. | 705/26 |
| 2001/0049649 A1 | 12/2001 | Baecker et al. | 705/37 |
| 2002/0002530 A1 | 1/2002 | May | 705/37 |
| 2002/0023038 A1 | 2/2002 | Fritsch et al. | |
| 2002/0023039 A1 | 2/2002 | Fritsch et al. | |
| 2002/0046127 A1 * | 4/2002 | Reding et al. | 705/26 |
| 2002/0052795 A1 * | 5/2002 | Dines et al. | 705/26 |
| 2002/0120555 A1 * | 8/2002 | Lerner | 705/37 |
| 2002/0138393 A1 | 9/2002 | Tatge | |
| 2002/0194115 A1 * | 12/2002 | Nordlicht et al. | 705/37 |
| 2003/0050901 A1 | 3/2003 | Jester | |
| 2006/0259417 A1 | 11/2006 | Marynowski et al. | |

FOREIGN PATENT DOCUMENTS

WO  WO 01/55752 A1  8/2001
WO  WO 01/57752 A1 *  9/2001

OTHER PUBLICATIONS

"Ins and Outs of Program Trading, and Why It's Being Blamed for Market Collapse," Los Angeles Times, Dec. 6, 1987, Los Angeles, California.
Philip Crawford, "The New High-Tech Investing: Computer as Fund Manager," International Herald Tribune, Feb. 1, 1992, New York, New York.
Barbara Lindemann Schlei, "Electronic Trading of Agricultural Products," Commonwealth Club, Jul. 8, 1980, pp. 1-22, San Francisco, California.
U.S. Appl. No. 09/835,088, filed Aug. 1, 2004, Reding.

* cited by examiner

*Primary Examiner*—M. Thein
(74) *Attorney, Agent, or Firm*—Law Offices of Grady L. White, LLC; Grady L. White, Esq.

(57) ABSTRACT

The invention is directed to methods and systems for commodities procurement with concomitant hedging. The invention enables automatic commodity purchase at a desired basis level when a seller's price matches a buyer's basis bid and concomitantly automatically placing an electronic commodities order to hedge the buyer's purchase.

27 Claims, 5 Drawing Sheets

| program to receive and transmit real-time commodity exchange-rate quotes from an exchange or broker | 505 |

| program to automatically calculate buyer bid based on the exchange-rate quote for a commodity | 510 |

| database for receiving dynamic data | 515 |

| program for displaying, entering, and transmitting bid and sell price data to the buyer and seller interfaces | 520 |

| program to identify when sell data conforms to bid data; withdraw buyer bid; and alert the buyer and seller of the match | 525 |

| program to automatically transmits a hedge transaction to an introducing broker or futures clearing merchant | 530 |

FIG. 5: software

METHODS AND SYSTEMS FOR PURCHASE OF COMMODITIES

1. FIELD OF THE INVENTION

The invention is directed to methods and systems for purchasing commodities with concomitant hedging.

2. BACKGROUND OF THE INVENTION

Today, the Internet hosts a multitude of sites and protocols whereby the sale of goods and commodities can be consummated. The majority of such sites and protocols are seller oriented where a seller advertises goods or commodities to a multitude of buyers to achieve an optimized selling price. The seller's goal is straightforward, i.e., once the goods are sold, the seller has achieved his objective.

Commodity buyers often hedge their purchases against the listed exchange rate for the same or a different commodity. For example, buyers of agricultural products often sell futures contracts at the exchange rate listed by the Chicago Board of Trade to hedge their purchases (i.e., take a short futures position). These "hedge purchasers" face a more complicated series of transactions than do sellers. Thus, it is not surprising that the seller-oriented platforms currently available on the Internet do not fully satisfy the hedge buyer's needs. First, the buyer must advertise a bid price to a plurality of sellers. Since the buyer will hedge his purchase, his bid price is based on the exchange rate listed for a particular hedge commodity (which may be the same commodity he is seeking to purchase). Since the hedge commodity's exchange rate is constantly fluctuating, the buyer must constantly adjust and post his current bid price. Furthermore, once the buyer buys, he should immediately complete the hedge transaction to avoid adverse price shifts of the hedge commodity.

A futures contract is a standardized contract to make or take delivery of a commodity or financial instrument at a predetermined time and place. Thus, a futures contract locks in a price for a future date. Some of the most popular futures contracts traded in the United States today are equity-based contracts such as the Dow Jones Industrial Average; interest rate contracts such as Treasury bonds and Treasury notes; agricultural contracts, such as corn, soybeans, and wheat; and precious metals, such as silver and gold.

Hedging is the practice of offsetting the price risk inherent in any cash market position by taking an equal but opposite position in the futures market. Hedgers use the futures markets to protect their business from adverse price changes. Thus, hedgers try to protect themselves from an inherent price risk associated with a future purchase or sale of an asset. A wide variety of institutions and individuals hedge, such as mortgage bankers, stock portfolio holders, food processors, and farmers. The classic example of a hedger using the futures market as a risk management tool is a farmer. Buyers of commodities often take a short futures position, which is a position in the market where one has sold futures contracts to offset risk. Because of the complexity of completing a transaction, hedge buyers generally spend long hours on the phone to transmit bids, consummate sales, and place their hedge.

Grain elevators provide facilities for elevating, storing, discharging, and sometimes processing grain. Country elevator operators, who generate a majority of their revenue through put-through and storage charges, have little desire to take on risk and thus hedge grain purchases against the futures price listed at the Chicago Board of Trade. Currently, grain elevators and grain producers conduct a majority of their business by phone. Elevator operators are constantly on the phone trying to find grain. Once the buyer locates a seller for the desired grain, he then needs to negotiate the price. After the grain is purchased, the buyer then needs to call a futures broker to place a futures hedge on the grain just purchased. Then the buyer starts the process all over again. An elevator operator may have anywhere from 100 to 2,000 different producers calling to check prices daily. It is very difficult for a buyer to remember who is offering what amount and at what price. With the futures price constantly changing, local basis levels constantly changing, and the phone-ringing non-stop it is difficult to execute transactions in an orderly fashion.

There are several factors that can simultaneously affect the price a grain elevator operator is willing to pay at a given time. In general, an elevator operator calculates his bid price based on a basis, which is the difference between the grain's current local cash price for a specific delivery period and the futures option price the commodity is being put against. The elevator buys the product this way because it makes it easier for them to hedge their purchases. When a grain producer calls to get a bid for his product, the elevator operator adds or subtracts his local cash basis from the Chicago Board of Trade futures price to come up with a flat price to quote to the grain producer.

Because hedge buyers (e.g., grain elevator operators) face a complicated series of transactions that require numerous hours on the telephone, there is a need for improved methods and systems for purchasing commodities with concomitant hedging.

3. SUMMARY OF THE INVENTION

The invention is directed to methods and systems for purchase of commodities with concomitant hedging. Multiple buyers and sellers can participate in the platform for any number of different commodities. The invention enables a prospective buyers of commodities the opportunity to automatically procure the commodity at a desired basis level when a seller's price matches a buyer's basis bid, and automatically place an electronic order for a listed commodity to hedge the purchase ("hedge commodity"). The methods and systems of the invention further enable the sellers to: (1) place an offer to sell to a buyer or place the same offer to sell to multiple buyers; (2) view buyer information and select the particular buyers with which to transmit sell data, e.g., based on buyer's requested delivery point; (3) continually monitor the buyers' basis bids, for example, from a Web site; (4) be notified when the sell data conforms to the buy data of a buyer. In one embodiment, sellers will manipulate their sell data to conform to the buyer's bid data, thus, the closest buyer will typically prevail and win the seller's offer. A buyer can specify multiple delivery options; his basis will typically reflect, among other variables, his costs corresponding to the particular point of delivery.

4. BRIEF DESCRIPTION OF THE FIGURES

These and other features, aspects, and advantages of the invention are better understood with regard to the following description, appended claims, and accompanying drawings where:

FIG. 5 is a diagram summarizing the software of the invention.

5. DETAILED DESCRIPTION OF THE INVENTION

Figure 1:
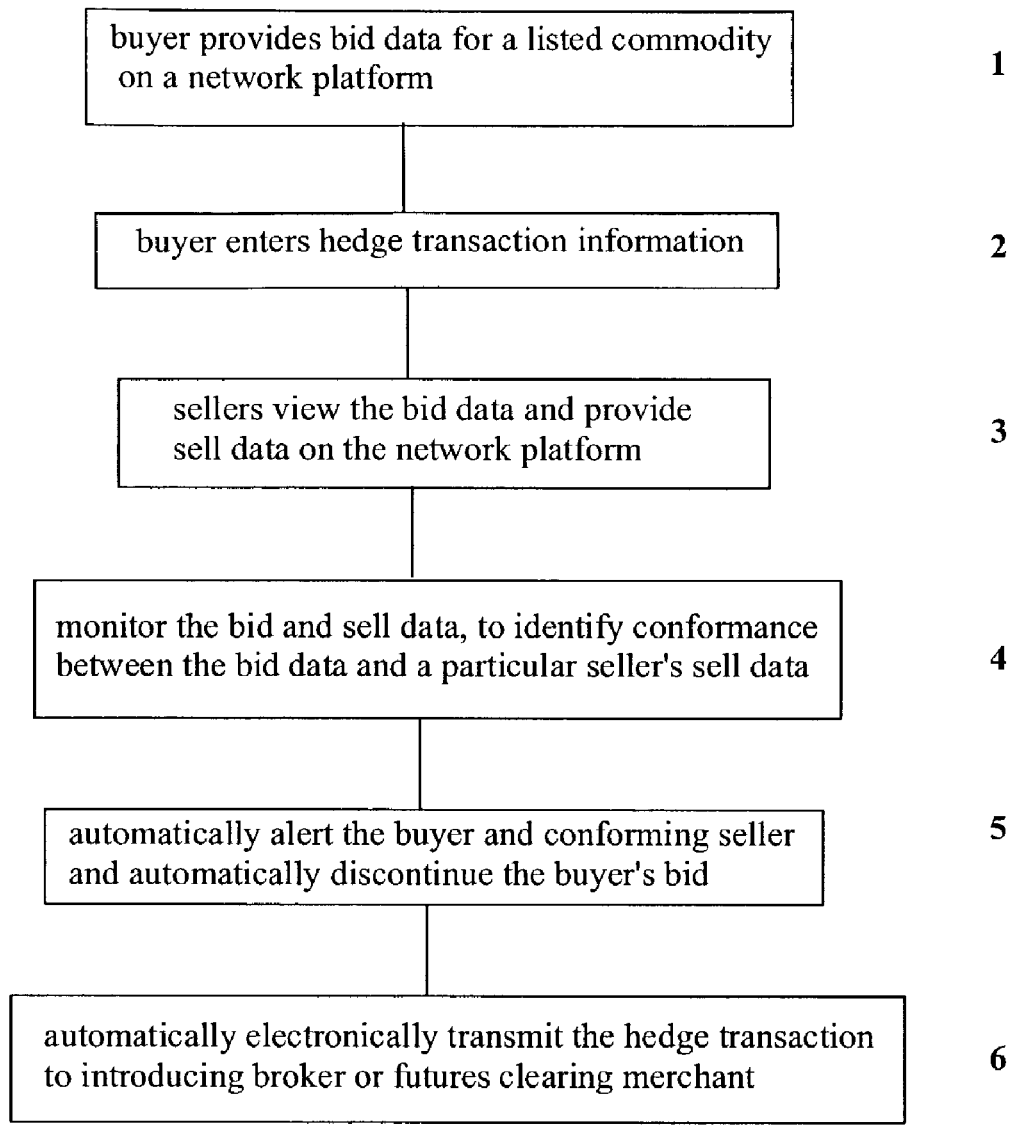
FIG. 1 is a flow chart of a preferred embodiment of the invention for purchase of a commodity with a concomitant hedge transaction.

FIG. 1 is a flow chart of a preferred embodiment of the invention. First, as indicated in Box 1, a buyer (or multiple buyers) provides bid data on the invention's network platform for a commodity desired to be purchased ("purchase commodity") using the methods and systems of the invention. According to the invention, the commodity the buyer wishes to purchase can be any item or service (see definition section 5.2). It is not required for the purchase commodity to be listed on an exchange. Each buyer participating in the platform may desire to purchase the same or a different commodity. Bid data typically includes the bid price, quantity desired, and point of delivery and, optionally, other relevant data. Of course, relevant data will vary depending on the commodity. Examples of relevant data include, but are not limited to, quantity sought, quality, delivery date, and delivery place etc.

Typically, a buyer selects the listed commodity with which he will hedge his purchase (i.e., the hedge commodity) to calculate the bid price. The methods and systems of the invention can receive and process real-time exchange rate quotes for listed commodities. Using these real-time quotes, the methods and systems of the invention can automatically and continually calculate and update the bid price based on the hedge commodity's real time quote. For example, the invention can automatically and continually calculate and update the buyers' bid prices by subtracting the buyer's basis from the real-time exchange-rate quote for the hedge commodity. Alternatively, the buyers can calculate a bid separately from the software and enter it manually.

As illustrated in Box 2, the buyers enter information respecting a hedge transaction. Typically this includes the hedge commodity to be purchased or sold, the amount, the introducing broker or futures clearing merchant from which it can be purchased, and ID or account numbers required by the introducing broker or futures clearing merchant. Typically, the hedge transaction will be executed at the time that a seller agrees to sell a commodity on the terms specified by the buyers.

Next, as indicated in Box 3, one or more sellers will review the bid data and submit sell data for the purchase commodity to the network platform. Sell data includes sell price and other relevant data, herein termed "sell data parcels". As with the bid data, relevant sell data will vary depending on the commodity, for example, quantity for sale, quality, and proposed delivery date and place etc.

Next, as indicated in Box 4, the methods and systems of the invention monitor the bid and sell data to identify conformance between the bid data and a particular seller's sell data. Depending on the commodity, conformance might require only a match in sell and buy price or may require the seller's commodity to conform with other specifications, such as quality, age, color, or type etc.

Preferably, as indicated in Box 5, when a conformance occurs, the program automatically alerts the conforming buyer and conforming seller (preferably by e-mail) and automatically discontinues that buyer's bid.

As indicated in Box 6, the methods and systems of the invention automatically transmit the hedge transaction programmed by conforming buyer to an introducing broker or futures clearing merchant. For example, a futures clearing merchant, such as Advanced Trading, will electronically send a futures order to a trade executor, such as EDFMAN, which has trading terminals on the floor of the Chicago Board of Trade.

Preferably, the methods and systems of the invention are Web based and located on a Web server. In a preferred embodiment, the Web site will further comprise information relevant to the commodities purchased and sold. For example, a Web site of the invention directed to agricultural commodities might display relevant current news, weather, and market information as well as a "Local Trends" section that allows the buyer to provide their own daily commentary of local information.

Figure 2A:
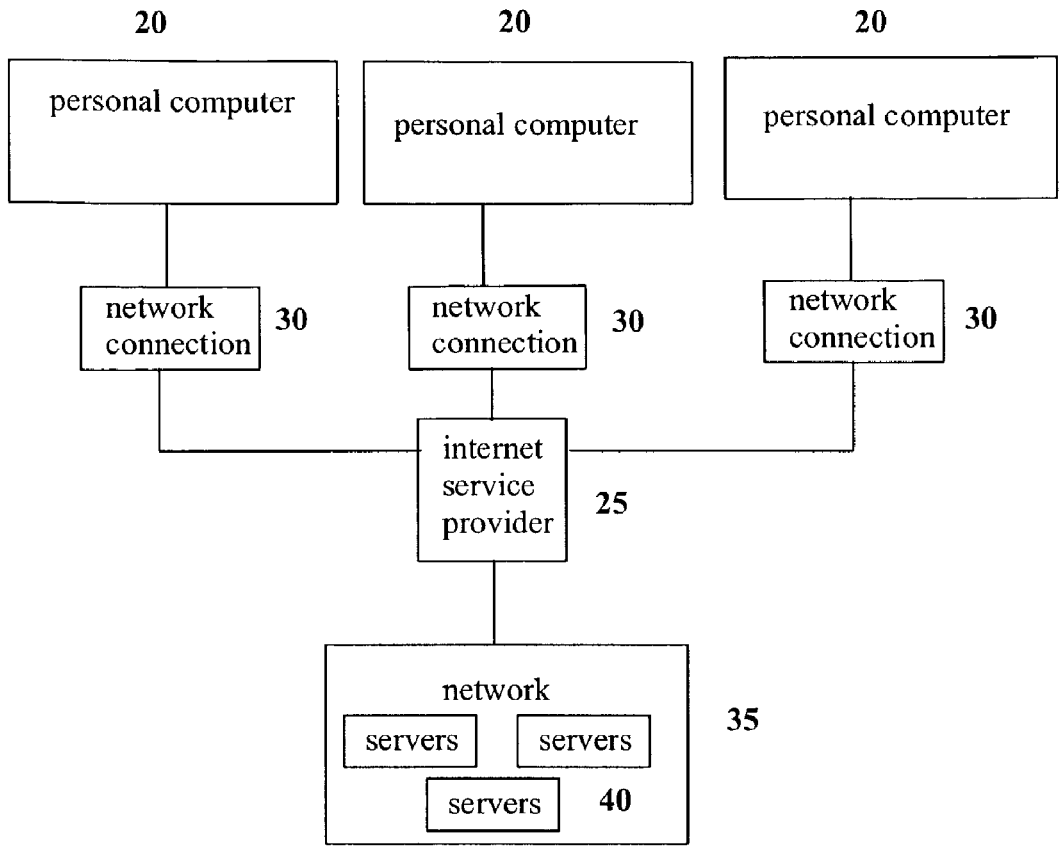
FIG. 2a illustrates a preferred network for use in the invention.

A preferred network for use in the invention is illustrated in FIG. 2a. A plurality of personal computers 20, are connected to an Internet service provider (ISP) 25 via a network connections 30, such as a modem and dialup telephone line, a digital subscriber line ("DSL"), or a cable modem connection. Internet service provider 25 interfaces with network 35, which comprises a plurality of Web content servers 40, including servers for control of domain-name resolution, routing, and other control functions The personal computers typically are configured with common Internet tools, including a Web browser to access servers 40 and specialized programs to connect with certain services. These services include electronic mail, one-to-many messaging (bulletin board), on-line chat, file transfer, and browsing. Browsing is effected using the Hypertext Transfer Protocol (HTTP), which provides users access to multimedia files using Hypertext Markup Language (HTML). The entire system of personal computers, internet service providers, and servers is called the Internet. The collection of servers 40 that use HTTP comprise the World Wide Web, which is the Internet's multimedia information delivery system.

Figure 2B:
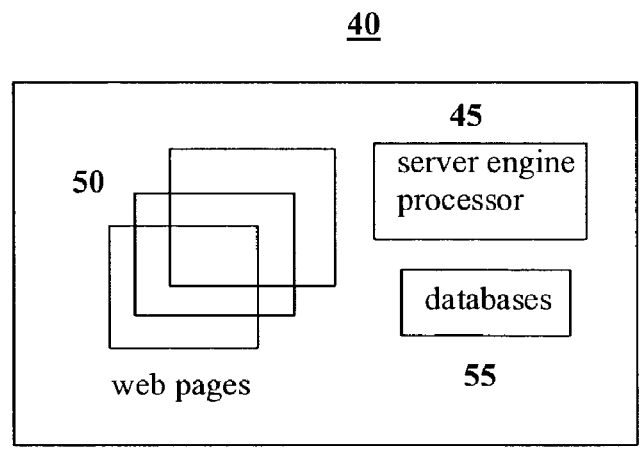
FIG. 2b illustrates a typical server for use in the invention.

FIG. 2b provides the details of a typical server 40 for use in the invention. Server engine 45 receives HTTP requests to access the Web pages 50 identified by Uniform Resource Locator ("URL") and provides the Web pages as an interface to the requesting personal computer 20. The databases 55 contain various tables storing information such as buyer and seller information.

5.1 System Architecture and Operation

Figure 3:
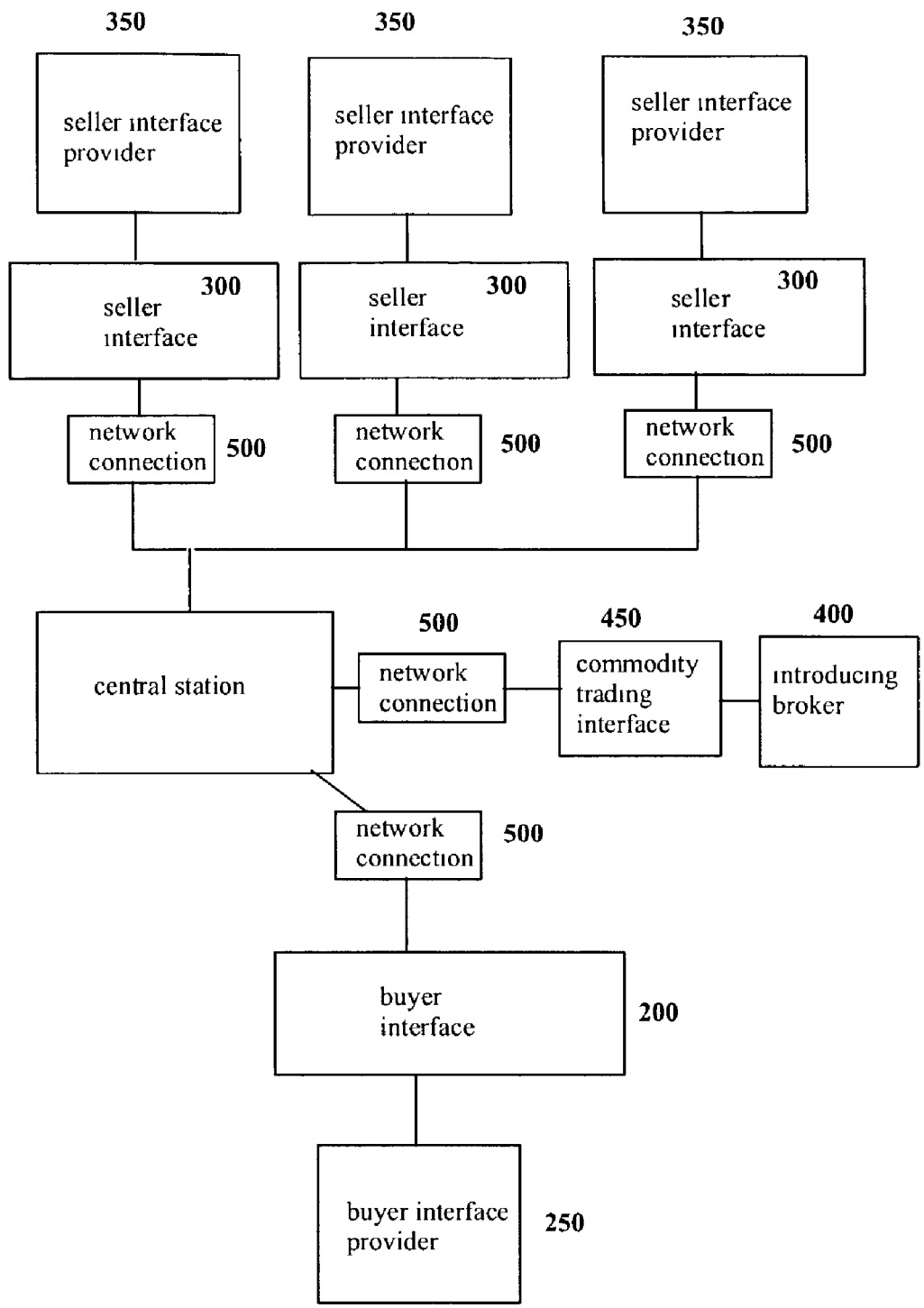
FIG. 3 is an outline of the preferred system architecture and operation of the methods and systems of the invention.

Referring to FIG. 3, a preferred embodiment of the invention comprises central station 100, buyer interface 200 (e.g., a Web page), buyer interface provider 250 (e.g., a computer used to access and display a buyer interface Web page), one or more seller interfaces 300, and their corresponding seller interface providers 350. In operation, a buyer enters hedge transaction data and bid data, including a bid price through interface 200 for transmittal to central station 100. The buyer can continually update the bid price and other bid data as appropriate. Alternatively, since the software of the invention can receive real-time exchange-rate quotes for listed commodities; the buyer can rely on software of the invention to automatically and continually calculate a bid price based on the real-time quote. For example, the software of the invention can automatically and continually calculate a bid price by subtracting the buyer's basis from a real-time exchange-rate quote for a particular commodity. Typically, the buyer selects the commodity with which he will hedge his purchase (i.e., the hedge commodity) to calculate the bid price.

Sellers review the bid data through seller interfaces 300 and transmit sell data, including a sell price to central station 100.

The software of the invention monitors the bid and sell data and identifies when the sell data conforms to the bid data (e.g., a match of sell price with buy price). When conformance occurs, the software of the invention automatically alerts the buyer and seller (preferably by e-mail), automatically discontinues the bid, and automatically transmits the hedge transaction to an introducing broker or futures clearing merchant 400 respecting a listed commodity (selected by the buyer) by way of trading interface 450 to hedge the buyer's purchase. Each of buyer interface 200, seller interface 300, and trading interface 400 communicate with central station 100 via network connections 500.

Any conventional personal computer, computer workstation, or server with sufficient memory and processing capability may be used as central station 100. In one embodiment, central station 100 is a buyer's personal computer. In another embodiment, central station 100 is an application service provider or a Web server providing a Web page. As is understood by those of skill in the art, an application service provider is an entity that offers individuals and enterprises access to applications and related services through the Internet (or other network) that would otherwise have to be located in local computers and/or devices.

Figure 4:
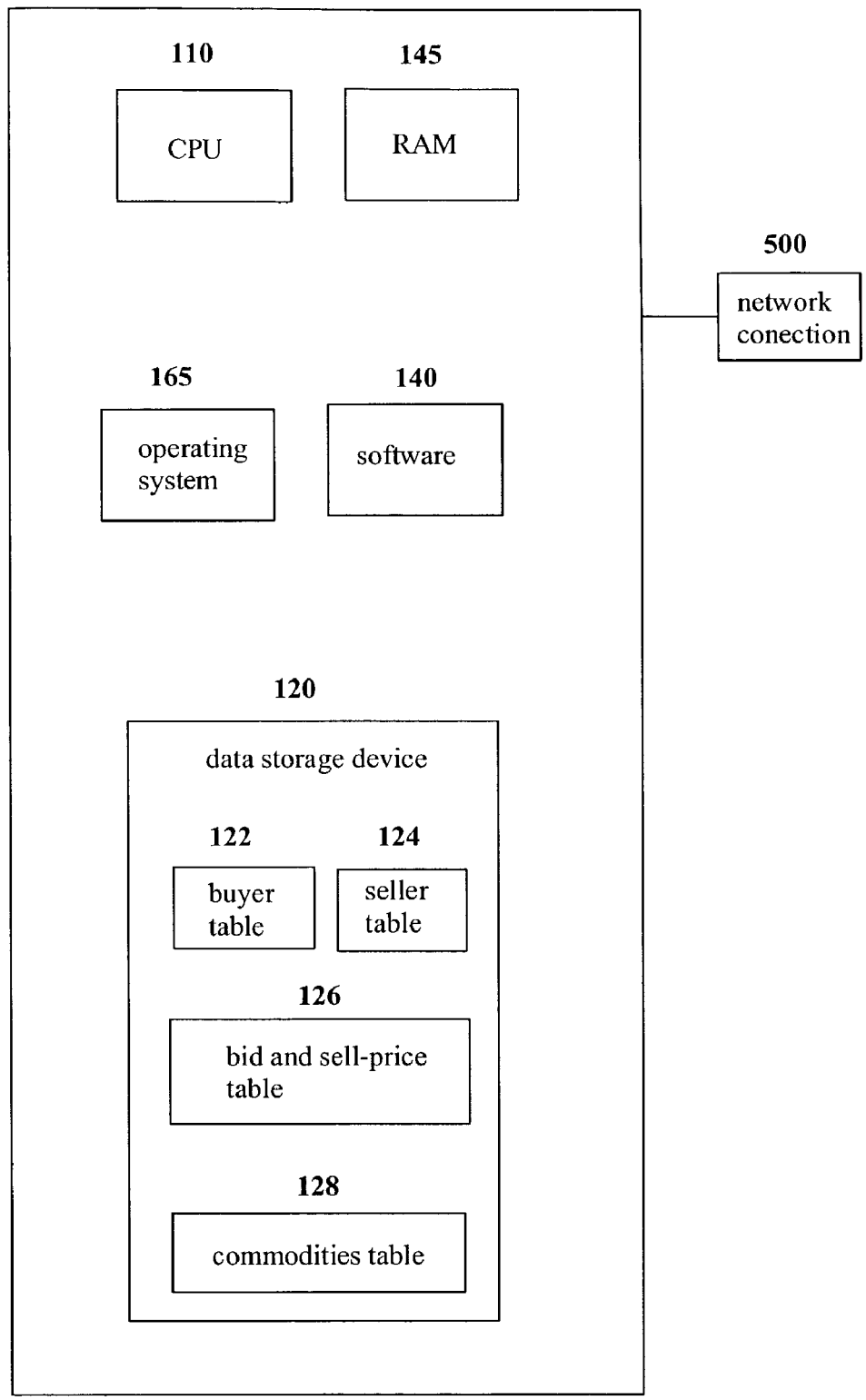
FIG. 4 is an illustration of a central station of the invention.

As shown in FIG. 4, central station 100 comprises central processor unit ("CPU") 110, data-storage device 120, software of the invention 140, random access memory ("RAM") 145, and operating system 165.

Examples of processors suitable for use in the invention include, but are not limited to, those sold by Sun Microsystems, Motorola, and Intel.

The RAM should preferably be of the error-correcting code (ECC) memory type and should be from 512 MB to 1 GB in total capacity.

The operating system should be robust and provide for security of the data in storage. Exemplary operating system include LINUX®, UNIX, Windows 2000®, or Windows NT®.

Data-storage device 120 stores information necessary to process transactions. The data-storage device should provide for re-writable data and should provide redundancy via mirroring or error correction (RAID), and it should have a fast interface to the operating system so that data can be made readily available to the network. Suitable data-storage devices include hard disks. Data-storage device 120 comprises: (1) buyer table 122; (2) seller table 124; (3) bid and sell price table 126; and (4) commodities table 128.

Buyer table 122 stores buyer information, such as name, buyer identification number, contact information, email address, etc.

Seller table 124 stores seller information, such as a unique seller identification number, contact information, email address, payment preferences, credit, delivery record, type of business, and commodities sold, etc. The seller table contains a mapping from each seller identification number to the seller interface that is provided by a collection of dynamic web pages.

Bid and sell-price table 126 stores bid prices and sell prices corresponding to the commodity bid on and the buyer's and seller's identity as well as other information about the pending transaction (e.g., quantity sought, quality, delivery date, and other relevant information).

Commodities table 128 stores a list of commodities that can be traded on the platform as well as information about each commodity. Relevant information will vary depending on the commodity. For example, a grain elevator bidding for grain might maintain a list of past bids, grain futures prices, basis information, supply issues, etc.

In a preferred embodiment, database software, such as SQL Server, manufactured by the Microsoft Corporation, is used to create and manage the database and tables. Other relational database products (e.g., those manufactured by Oracle Corp.) can be used for data storage management.

Referring to FIG. 3, buyer and seller interfaces 200 and 300 display or transmit, a user friendly set of pictures, text, or voice statements that provide instructions and protocols indicating how a user is to communicate with and use the platform of the invention and direct the computer software of the invention located on the user's computer 250 or 350 or on central station 100. For example, the interfaces will prompt for and accept passwords, provide prompts for data entry, and display information stored in the data tables, etc. Interface 200 and 300 are accessed and displayed by an interface providers 250 and 350, preferably, personal computers having an input device, such as a keyboard, mouse, or conventional voice-recognition software package; a display device, such as a video monitor; and a network connection such as a modem.

5.1.1 Software of the Invention

FIG. 5 is a diagram summarizing the software of the invention, which comprises:
(1) a program to receive real-time commodity exchange-rate quotes from an exchange, an introducing broker, or futures clearing merchant;
(2) a program to automatically calculate a buyer's bid based on the exchange-rate quote for a commodity;
(2) a database for receiving dynamic data;
(3) a program for displaying, entering, and transmitting bid and sell price data to the buyer and seller interfaces;
(4) a program to identify when sell data conforms to bid data, withdraw buyer bid, and alert the buyer and seller of the match; and
(5) a program to automatically transmit a hedge transaction to an introducing broker or futures clearing merchant.

The software of the invention comprises a program to receive and process real-time exchange rate quotes for listed commodities (505). This functions in conjunction with a program that can automatically and continually calculate and update the bid price based on the real time quote (510).

Software of the invention comprises dynamic database (515) for receiving dynamic data, such as the real-time exchange-rate quotes.

The software of the invention further comprises a program (520) for displaying, entering, and transmitting bid and sell-price data from and to the buyer and seller interfaces. Thus, sellers can review the bid through the seller interface and transmit sell prices to the central station for matching with the bid price.

The software of the invention further comprises a program (525) to monitor the bid and sell prices, to identify conformance between a bid data and a particular seller's sell data, and to identify the corresponding seller. When a conformance occurs, the program automatically alerts the buyer and seller (preferably by e-mail) and automatically discontinues the buyer's bid. Depending on the commodity, conformance might require only a match in sell and buy price or may require the seller's commodity to conform with other specifications, such as quality, age, color, or type etc.

The software further comprises a program (530) to automatically transmit a hedge transaction to introducing broker or futures clearing merchant 400 respecting the hedge commodity (selected by the buyer).

There are many commercial software applications that can enable the communications required by seller interface 200, buyer interface 300, and commodity trading interface 450. Eudora Pro manufactured by Qualcomm Inc., for example, provides editing tools for the creation of messages as well as the communications tools to send the message to the appropriate electronic address. When central station 100 is configured as a Web server, conventional communications software such as Internet Information Server, for delivering web pages, and Internet Explorer, for viewing web pages, by Microsoft Corp. can be used.

Preferably, the software of the invention is Web based and located on a Web server. Software of the invention is readily designed by one of skill in the art or available commercially.

5.1.2 Calculation of the Bid Price by the Buyer

A buyer calculates a bid price based on many different factors and variables including the nature of the commodity sought and the listed hedge commodity, their current exchange rate, market trends, etc. For example, a buyer may calculate his bid price by subtracting a basis from the current exchange rate of a particular listed hedge commodity.

Typically, a grain elevator will calculate a bid price for a desired quantity of grain by subtracting a basis. The basis is the arithmetical difference between the local cash price for the grain and its corresponding futures price listed by the Chicago Board of Trade at a point in time. This allows the elevator to effectively hedge his purchase of grain. Although cash and futures prices do not always parallel one another, often a cash-price shift results in a similar futures shift, particularly if some unexpected event causes a violent price change. The basis may, among other things, reflect the elevator's expenses and allow for a profit. Basis considerations for an elevator purchasing grain might include local supply issues, such as the predicted quality of the coming year's crop and local demand issues, as well as national and world grain indicators. For discussions, see TEWELES ET AL., THE FUTURES GAME; WHO WINS WHO LOSES AND WHY 33 (1987); HENRY B. AUTHUR, COMMODITY FUTURES AS A BUSINESS MANAGEMENT TOOL 64-69 (1971), both of which are hereby incorporated herein by reference.

5.1.3 The Seller's Interface and Posting the Sell Data

Initially, the seller must establish an account with the buyer. Typically this requires the seller to provide name, address, contact information, credit information, etc. The seller will calculate his sell price based on a number of different factors specific for the commodity he wishes to sell. Cost of delivering the commodity to the buyer upon sale "freight" costs is typically included, particularly in selling agricultural products, such as grain. Thus, a farmer will first calculate a "net" sell price and add a different freight cost depending on the buyer's location.

The seller logs onto central station 100 through the seller interface 300, establishing a communication link by entering a password or seller ID. The seller may be an individual, a corporation, a partnership, a government, or any other entity. In one embodiment, central station 100 has a page on the World Wide Web, allowing the seller to provide information through the interface of conventional Web browser.

The software of the invention allows the seller to access, through seller interface 300, the buyer's platform at central station 100 and to view the buyer's bid price and specifications for the desired commodity. More or less information will be available to the seller depending on the commodity's nature and the buyer's platform policy.

The seller can then enter a firm sell price as well as other required information according to the platform policy. The offer will remain open for a period of time depending on the platform policy.

The seller logs onto the platform (typically hosted and operated by the buyer) and enters information required by the platform policy, such as seller information, quantity, delivery date, sell price, etc. As discussed above, a multitude of sellers can be logged on a buyer's platform and bid against one another.

Authentication of the seller's identity involves central station 100 extracting the seller ID from seller response and looking up the seller's identity in seller table 124. Information in seller table 124 provides an indication of the seller's ability to deliver the goods. If necessary, central station 100 can verify that the seller can provide the specific commodity. In another embodiment, the seller adds in his response to the buyer's bid that a contract is agreed to, for example, a digital signature.

Central station 100 then verifies the status of the bid to determine whether it is still active. In one embodiment, if the bid is still active a unique tracking number can be added to seller response. Central station 100 then stores the seller's response. If the bid is not active, the seller response is refused by central station 100 and transmitted back to the potential seller.

In another embodiment, the seller transmits the seller response directly to the buyer. The buyer may then send the seller a response through central station 100 for verification and authentication, or he may choose to accept seller response without verification and authentication.

The software and platform of the invention monitors the sell price data and bid price data to detect conformation therebetween. Conformance can occur if, for example, the bid price matches the sell price: (1) seller lowers the sell price to equal the bid price, or (2) the buyer raises the bid until it equals the sell price. The seller can monitor the buyer's bid prices, perhaps adjust his sell price, or simply turn off his computer and wait for the buyer's bid to match the sell price.

An example of what information a seller's interface (here seller A) might display according to the invention is shown in Tables 1.1-1.3 below. Values are included in Table 1 for exemplary purposes. In this example, the seller entered the platform of the invention, for example, by way of a Web page interface, viewed buy data for a plurality of buyers, and chose to offer to sell to buyer's 001, 002, and 003 at a specific price based on the commodity they offered to buy, their location (e.g., to account for delivery costs), their buy price, and other information.

TABLE 1.1

Seller's Interface For Buyer 001 buyer: 001
quantity requested: 100 units
delivery date: immediately
delivery location: buyer 001's address

| Time | quantity for sale | sell price | buyer's bid | difference |
|---|---|---|---|---|
| 1 | 100 units | $10.00/unit | $9.95/unit | $0.05 |
| 2 | 100 units | $10.00/unit | $9.98/unit | $0.02 |
| 3 | 100 units | $10.00/unit | $10.00/unit | $0.0 (sold) |

TABLE 1.2

Seller's Interface For Buyer 002 buyer: 002
quantity requested: 100 units
delivery date: immediately
delivery location: buyer 002's address

| Time | quantity for sale | sell price | buyer's bid | difference |
|------|-------------------|------------|-------------|------------|
| 1 | 100 units | $10.10/unit | $9.96/unit | $0.14 |
| 2 | 100 units | $10.10/unit | $9.97/unit | $0.13 |
| 3 | 100 units | $10.10/unit | $8.80/unit | $0.30 |

TABLE 1.3

Seller's Interface For Buyer 003 buyer: 003
quantity requested: 100 units
delivery date: immediately
delivery location: buyer 003's address

| Time | quantity for sale | sell price | buyer's bid | difference |
|------|-------------------|------------|-------------|------------|
| 1 | 100 units | $10.20/unit | $9.90/unit | $0.30 |
| 2 | 100 units | $10.20/unit | $9.91/unit | $0.29 |
| 3 | 100 units | $10.20/unit | $9.92/unit | $0.28 |

Tables 1.1-1.3 illustrate the general case where a seller A entered a sell price and waited for one of a plurality of buyer's—seeking to purchase seller A's commodity—bid to match the sell price. This occurred at time point 3. At this time, the software would automatically withdraw buyer 001's bid from the platform; notify the conforming buyer and seller of the match, preferably by e-mail; and execute the buyer's hedge transaction. At time point 3, the match could have occurred by either the software and platform of the invention automatically updating the buyer's bid price (e.g., by calculating a new bid price based on the current exchange rate of a listed commodity) or the buyer manually entered a new, higher bid price that matched seller 001's sell price.

5.1.4 The Buyer Interface and Posting the Bid Data

The software of the invention allows the buyer to access, through buyer interface 200, the platform at central station 100 where he can: (1) Post a bid data, such as post a bid price for a particular amount of a particular commodity of particular type or quality and instruct the software whether the bid is to be continually updated according to the exchange rate for a particular listed commodity. The buyer can specify the particular quality desired, for example, agricultural products might have to meet certain quality specifications; (2) Program a specific hedge transaction for a particular hedge commodity that the software will automatically execute upon sale consummation; and (3) view information respecting a plurality of sellers, including the sell prices.

Table 2 below is a general example of information that might be displayed on the buyer's interface 200 for a bid to purchase a commodity. The buyer receives a plurality of sell prices for the desired commodity. In this case, three sellers (ID Nos. 001, 002, and 003) have posted offers to sell and sell prices on the buyer's platform.

TABLE 2

Buyer's Experience buyer: 001
quantity requested: 100 units
delivery date: immediately
delivery location: buyer 001's address

| Time | quantity for sale | sell price | buyer's bid | difference |
|------|-------------------|------------|-------------|------------|
| | | Seller ID No. 001 | | |
| 1 | 100 units | $10.00/unit | $9.95/unit | $0.05 |
| 2 | 100 units | $10.00/unit | $9.98/unit | $0.02 |
| 3 | 100 units | $10.00/unit | $9.50/unit | $0.50 |
| | | Seller ID No. 002 | | |
| 1 | 100 units | $10.50/unit | $9.95/unit | $0.55 |
| 2 | 100 units | $10.50/unit | $9.98/unit | $0.52 |
| 3 | 100 units | $10.50/unit | $9.50/unit | $1.00 |
| | | Seller ID No. 003 | | |
| 1 | 100 units | $10.00/unit | $9.95/unit | $0.05 |
| 2 | 100 units | $10.00/unit | $9.98/unit | $0.02 |
| 3 | 100 units | $9.50/unit | $9.50/unit | $0.0 (sold) |

In the above example, seller 003 sold 100 units of a commodity to the buyer 001 for $9.50 per unit. The sale was consummated upon the seller's lowering his sell price to match the buyer's bid price. Simultaneously, the buyer's bid was withdrawn from the platform and the hedge transaction programmed by the buyer was automatically executed.

5.1.5 Placing the Hedge Transaction

As discussed above, in a preferred embodiment, the software of the invention automatically executes a hedge transaction for the buyer when the sell-price and buy-price data match. The software of the invention prompts the buyer through buyer interface 200 to enter the hedge transaction data, such as the hedge commodity, the amount, and manner in which the transaction is to be executed. Referring to FIG. 3, when the buy data and sell data conform, the software of the invention automatically transmits the hedge order to central station 100 where it is processed as appropriate, for example, electronically directed to introducing broker or futures clearing merchant 400.

The execution can be any means effective to notify an introducing broker or futures clearing merchant to place the order to buy or sell the hedge commodity. For example, the software of the invention can be configured to transmit an electronic mail or voice mail order to an introducing broker or futures clearing merchant. The broker can read the e-mail or listen to the voice mail and then execute the transaction. Preferably, the software of the invention is configured to directly buy or sell the hedge commodity through a commodities-trading interface 450 (FIG. 3). Many exchanges, introducing broker or futures clearing merchants operate trading platforms that instantaneously mediate binding, direct purchase or sale of listed commodities through electronic trading software.

For example, the Chicago Board of Trade's Electronic Open Outcry Market enables futures clearing merchant member firms to electronically manage customer business from both off-floor and on-floor locations. The crucial component is that an electronic customer order ticket (e-ticket) is created during the order initiation phase and new information is added to that original order during the trade execution and trade processing phases.

During the order initiation phase, the order is electronically created by software of the invention through an Internet order entry system. In the trade execution phase, the broker receives the electronic order ticket. The broker executes the order and adds the execution price and opposing firm/broker information to the ticket. The broker also adds trade endorsement data to a flashed-order ticket. Then the tickets are electronically returned to the futures clearing merchant member firm.

In the trade confirmation/processing phase, the futures clearing merchant order entry staff (and Internet customer) receive the electronic trade confirmation. The futures clearing merchant back office also receives that same electronic trade ticket. There, additional account information is automatically downloaded onto the order ticket and the ticket is sent on to clearing for trade matching on a real-time basis.

5.2 Definitions

As used herein, the term "network" means any system of two or more interconnected computers. Examples of networks include, but are not limited to, the Internet and other Wide Area Networks (WANs), and Local Area Networks (LANs).

As used herein, the phrase "network connection" means any channel by which a person, party, or business entity can interface or communicate with a network. Examples of network connections include, but are not limited to, telephone lines by way of internal or external modems, digital subscriber lines ("DSL"), voice mail and voice pages; dedicated data lines; cellular phone communication; communication by way of satellite; and cable television lines.

As used herein, the term "platform" means a system of software and hardware located on a network that performs a function, such as providing services or information and which is accessible through a network interface.

As used herein, the phrase "platform policy" means a set of rules and protocols governing access to and use of services offered on a platform. Platform policies will govern access to and use of services offered through a Web page, voice page, or other network interface. Examples of platform rules include entry of passwords and account information, payment of fees, prohibited use of profane language, methods of payment, and dates when payments are due.

As used herein, the term "interface" means a displayed or transmitted, user friendly set of pictures, text, or voice statements that provide instructions and protocols indicating how a user is to communicate and interact with a platform. For example, an interface allows a user to direct computer software located on the user's computer or within a network. Examples of interfaces include, but are not limited to, Web pages, e-mail transmittals, voice pages, voice mail instructions, and facsimile transmissions (fax). An interface is displayed or provided by an "interface provider", for example, a personal computer displaying a Web page interface.

As used herein, the term "automatically" means execution by computer software upon occurrence of an event or satisfaction of a condition without instruction from or intervention of a user.

As used herein, the term "buyer" means any person, party, or business entity that desires to purchase a commodity.

As used herein, the term "seller" means any person, party, or business entity that desires to sell a commodity.

As used herein, the term "commodity" means any good or service that can be purchased.

As used herein, the phrase "listed commodity" means any commodity that is listed on an exchange. Exchanges include, but are not limited to United States exchanges, for example, American Stock Exchange, Chicago Board of Exchange, Chicago Board of Trade, Chicago Mercantile Exchange, Coffee, Sugar & Cocoa Exchange, Currenex (currency exchange), Futurecom: Electronic Trading Exchange, International Securities Exchange (options), NASDAQ Stock Market, New York Board of Trade, New York Cotton Exchange, New York Mercantile Exchange, New York Stock Exchange, OTC Bulletin Board, Arizona Stock Exchange, Boston Stock Exchange, Chicago Stock Exchange, Cincinnati Stock Exchange, Iowa Electronic Markets, Kansas City Board of Trade, Mid America Commodity Exchange, Minneapolis Grain Exchange, Pacific Exchange, Philadelphia Stock Exchange, San Diego Stock Exchange, Archipelago (ARCA), Attain (ATTN), Bloomberg Tradebook (BTRD), GlobeNet, Island (ISLD), Instinet (INCA), MarketXT, NexTrade (NTRD), onExchange, Primex, REDIbook (REDI), and Strike (STRK); Canada exchanges, such as Canadian Venture Exchange (merger of the Alberta and Vancouver exchanges), Montreal Exchange (Bourse de Montréal), Nasdaq-Canada, Toronto Stock Exchange, Winnipeg Commodity Exchange, and Winnipeg Stock Exchange; European exchanges, for example, EASDAQ (see NASDAQ Europe), Eurex: The European Derivatives Market, Euronext (merger of the Amsterdam, Brussels, and Paris exchanges), International Petroleum Exchange, Jiway.com, NASDAQ Europe; Austrian Exchanges, for example, NEWEX, and Wiener Börse (Vienna Stock Exchange and Austrian Futures & Options Exchange); French exchanges, for example, Bourse de Paris (see Euronext), Marche a Terme International de France (MATIF), Marche des Options Negociables de Paris (MONEP), and Nouveau Marché; German exchanges, for example, Baden-Württembergische Wertpapierbörse zu Stuttgart, Bayerische Börse (Munich), Berliner Wertpapierbörse (Berlin Stock Exchange), Bremer Baumwollbörse (Bremen Cotton Exchange), Deutsche Börse, Hamburger Börse, Neuer Markt, Rheinisch-Westfälische Börse zu Düsseldorf, SMAX (small caps), Warenterminbörse Hannover (Commodity Exchange Hannover), and Xetra: an ECN; Russian exchanges, for example, Inter-Republican Universal Commodity Exchange (Offline May 2, 2001), Moscow Interbank Currency Exchange, Moscow Central Stock Exchange, Moscow Stock Exchange, Nijny Novgorod Stock and Currency Exchange, Russian Exchange, Russian Trading System, St. Petersburg Futures Exchange, St. Petersburg Monetary Exchange, St. Petersburg Stock Exchange, Siberian Interbank Currency Exchange, Siberian Stock Exchange (Under construction), Ural Stock Exchange, and FCSM of Russia Information Disclosure Program (Russian EDGAR); The Switzerland Swiss Exchange; English exchanges, for example, Baltic Exchange, E-Crossnet: an ECN, London Clearing House: an ECN, London International Financial Futures and Options Exchange, London Metal Exchange, London Securities and Derivatives Exchange, London Stock Exchange, and virt-x (formerly Tradepoint Stock Exchange); Australian exchanges, for example, Australia Australian Stock Exchange, Bendigo Stock Exchange, Stock Exchange of Newcastle, Sydney Futures Exchange; Chinese exchanges, such as, China-Commodity Futures Exchange of Hainan (Offline Jan 2002), Dalian Commodity Exchange, Shanghai Futures Exchange, Shanghai Metal Exchange, Shanghai Stock Exchange, Shenzhen Metal Exchange, Shenzhen Stock Exchange, Tianjin United Futures Exchange, and Zhengzhou Commodity Exchange, Chinese Gold & Silver Exchange Society, Growth Enterprise Market, and Hong Kong Exchanges (Hong Kong Futures Exchange, Stock Exchange of Hong Kong); Japanese exchanges, such as, Central Japan Commodity Exchange (Chubu Commodity Exchange, Nagoya Textile Exchange)), Hiroshima Stock Exchange, Fukuoka Futures Exchange, JASDAQ, Kanmon Commodity Exchange (Offline January 2002), Kansai Commodities Exchange (Osaka Grain Exchange, Osaka Sugar Exchange, Kobe Grain Commodities Exchange, and Kobe Raw Silk Exchange), NASDAQ-Japan, Nagoya Stock Exchange, Osaka Mercantile Exchange (Osaka Textile Exchange, Kobe Rubber Exchange), Osaka Securities Exchange, Tokyo Commodity Exchange, Tokyo Grain Exchange, Tokyo International Financial Futures Exchange, Tokyo Stock Exchange, and Yokohama Commodity Exchange.

Examples of listed commodities include, but are not limited to, stocks; bonds; futures, such as grain futures, including corn, wheat, barley, and milo; treasury notes; treasury bills; currency; precious metals; derivatives.

As used herein, the phrase "exchange rate" means the price listed by an exchange for a listed commodity at a particular time.

As used herein, the term "bid data" means the bid price a buyer is offering to purchase a commodity and, optionally, other relevant information, such as quantity sought, quality, delivery date, and delivery place etc.

As used herein, the term "sell data" means the sell price a seller is offering to sell a commodity and, optionally, other relevant information, such as quantity for sale, quality, proposed delivery date and place etc. A "sell data parcel" is the sell data associated with a particular seller.

As used herein, the term "purchase commodity" means any commodity that a buyer wishes to buy.

As used herein, the term "hedge commodity" means a listed commodity (listed on an exchange) having a current exchange rate with which a buyer wishes to hedge the buy of the purchase commodity.

6. EXAMPLES

6.1 Example 1

Tables 3.1 to 3.4 illustrate an example where a seller (farmer) seeks to sell 10,000 bushels of grain to various buyers (grain elevators). The tables show information that might be displayed on the farmer's interface 300 according to the invention. The farmer calculates a net sell price based on the costs of growing and harvesting the crop and accounting for desired profits (in this example $1.80/bushel). The farmer logs onto the platform (e.g., Web page) and views data for a number of buyers including bid price, quantity, and other information. The farmer then selects four buyers (Nos. 001-004) at four different locations (in this case grain elevators) for which to place bid data and posts his net sell price of $1.80/bushel and a freight cost corresponding to the particular buyer's location. As indicated by the Tables 2.1-2.4, the platform automatically calculates the farmers sell price by subtracting the freight price from the net price. The platform also continually calculates and updates the buyer's bid by subtracting a basis from the current value of December grain futures price as listed by the Chicago Board of Trade. Accordingly, the bid price may be raised: (a) by reducing the basis; or (b) the futures market for the commodity increases to a level such that the bid price matches the selling price after subtracting the basis. The software of the invention updates the seller's interface continually.

TABLE 3.1

Grain Seller's Interface At Time 1

| quant. to sell | Buyer No. and (location) | net price | freight | sell price | Dec. Futures Price | buyer's basis | buyer's bid | diff. |
|---|---|---|---|---|---|---|---|---|
| 10,000 | 001 (Decatur) | $1.80 | 0.02 | $1.82 | $2.20 | $-0.44 | $1.76 | $0.06 |
| 10,000 | 002 (Peoria) | $1.80 | 0.03 | $1.83 | $2.20 | $-0.45 | $1.75 | $0.08 |
| 10,000 | 003 (Faribault) | $1.80 | 0.04 | $1.84 | $2.20 | $-0.46 | $1.74 | $0.1 |
| 10,000 | 004 (Boise) | $1.80 | 0.01 | $1.81 | $2.20 | $-0.47 | $1.73 | $0.8 |

*prices and quantities are in bushels

TABLE 3.2

Grain Seller's Interface At Time 2

| quant. to sell | Buyer No. and (location) | net price | freight | sell price | Dec. Futures Price | buyer's basis | buyer's bid | diff. |
|---|---|---|---|---|---|---|---|---|
| 10,000 | 001 (Decatur) | $1.80 | 0.02 | $1.82 | $2.22 | $-0.44 | $1.78 | $0.04 |
| 10,000 | 002 (Peoria) | $1.80 | 0.03 | $1.83 | $2.22 | $-0.45 | $1.77 | $0.06 |
| 10,000 | 003 (Faribault) | $1.80 | 0.04 | $1.84 | $2.22 | $-0.46 | $1.76 | $0.08 |
| 10,000 | 004 (Boise) | $1.80 | 0.01 | $1.81 | $2.22 | $-0.47 | $1.75 | $0.06 |

TABLE 3.3

Grain Seller's Interface At Time 3

| quant. to sell | Buyer No. and (location) | net price | freight | sell price | Dec. Futures Price | buyer's basis | buyer's bid | diff. |
|---|---|---|---|---|---|---|---|---|
| 10,000 | 001 (Decatur) | $1.80 | 0.02 | $1.82 | $2.23 | $-0.44 | $1.79 | $0.03 |
| 10,000 | 002 (Peoria) | $1.80 | 0.03 | $1.83 | $2.23 | $-0.45 | $1.78 | $0.05 |
| 10,000 | 003 (Faribault) | $1.80 | 0.04 | $1.84 | $2.23 | $-0.46 | $1 77 | $0.07 |
| 10,000 | 004 (Boise) | $1.80 | 0.01 | $1.81 | $2.23 | $-0.47 | $1.74 | $0.05 |

TABLE 3.4

Grain Seller's Interface At Time 4

| quant. to sell | Buyer No. and (location) | net price | freight | sell price | Dec. Futures Price | buyer's basis | buyer's bid | diff. |
|---|---|---|---|---|---|---|---|---|
| 10,000 | 001 (Decatur) | $1.80 | 0.02 | $1.82 | $2.26 | $-0.44 | $1.82 | $0.00 (sold) |
| 10,000 | 002 (Peoria) | $1.80 | 0.03 | $1.83 | $2.26 | $-0.45 | $1.81 | $0.02 |
| 10,000 | 003 (Faribault) | $1.80 | 0.04 | $1.84 | $2.26 | $-0.46 | $1.80 | $0.04 |
| 10,000 | 004 (Boise) | $1.80 | 0.01 | $1.81 | $2.26 | $-0.47 | $1.79 | $0.03 |

In this example, the grain seller waited for the futures price to rise to a level such that when elevator 001 subtracted his basis at time 4, the bid price and the sell price matched. At time 4, the bid data conformed to the sell data and both farmer and elevator were notified by e-mail that the farmer was willing to sell and the elevator was willing to buy 10,000 bushels of grain for $1.82/bushel. Simultaneously, buyer 001's bid was automatically withdrawn from the view of other sellers and the buyer 001's hedge transaction was automatically executed.

6.2 Example 2

Tables 4.1-4.4 below illustrate a specific example of information that might be displayed on grain elevator 001's interface upon posting an offer to buy 10,000 bushels of grain on the platform to be delivered in Decatur in October. The elevator chose December grain futures to calculate his bid price. The platform of the invention automatically and continually updates the elevator's bid price by subtracting his basis from the current futures price listed by the Chicago Board of Trade.

As a hedge transaction, the elevator instructed the platform to sell a futures contract for 10,000 bushels of grain from a current futures clearing merchant (for a transaction fee of course) at the Chicago Board of Trade's futures price at the time a sale is consummated with a seller. The buyer calculated the basis to include the cost of the transaction fee, storage costs, elevation costs, other operation costs, and his desired profit.

TABLE 4.1

Grain Elevator 001's Interface At Time 1

| Seller | quantity | sell price | Dec. Futures Price | elevator's basis | buyer's bid | diff. |
|---|---|---|---|---|---|---|
| A | 10,000 | $1.82 | $2.20 | $-0.44 | $1.76 | $0.06 |
| B | 10,000 | $1.83 | $2.20 | $-0.44 | $1.76 | $0.07 |
| C | 10,000 | $1.84 | $2.20 | $-0.44 | $1.76 | $0.08 |
| D | 10,000 | $1.85 | $2.20 | $-0.44 | $1.76 | $0.09 |

*Prices and quantities are in bushels

TABLE 4.2

Grain Elevator 001's Interface At Time 2

| Seller | quantity | sell price | Dec. Futures Price | elevator's basis | buyer's bid | diff. |
|---|---|---|---|---|---|---|
| A | 10,000 | $1.82 | $2.22 | $-0.44 | $1.78 | $0.04 |
| B | 10,000 | $1.83 | $2.22 | $-0.44 | $1.78 | $0.05 |
| C | 10,000 | $1.84 | $2.22 | $-0.44 | $1.78 | $0.06 |
| D | 10,000 | $1.85 | $2.22 | $-0.44 | $1.78 | $0.07 |

TABLE 4.3

Grain Elevator 001's Interface At Time 3

| Seller | quantity | sell price | Dec. Futures Price | elevator's basis | buyer's bid | diff |
|--------|----------|------------|--------------------|------------------|-------------|------|
| A | 10,000 | $1.82 | $2.23 | $−0.44 | $1.79 | $0.03 |
| B | 10,000 | $1.83 | $2.23 | $−0.44 | $1.79 | $0.04 |
| C | 10,000 | $1.84 | $2.23 | $−0.44 | $1.79 | $0.05 |
| D | 10,000 | $1.85 | $2.23 | $−0.44 | $1.79 | $0.06 |

TABLE 4.4

Grain Elevator 001's Interface At Time 4

| Seller | quantity | sell price | Dec. Futures Price | elevator's basis | buyer's bid | diff. |
|--------|----------|------------|--------------------|------------------|-------------|-------|
| A | 10,000 | $1.82 | $2.26 | $−0.44 | $1.82 | $0.00 (sold) |
| B | 10,000 | $1.83 | $2.26 | $−0.44 | $1.82 | $0.01 |
| C | 10,000 | $1.84 | $2.26 | $−0.44 | $1.82 | $0.02 |
| D | 10,000 | $1.85 | $2.26 | $−0.44 | $1.82 | $0.03 |

At time 4, the farmer A's sell data conformed to the elevator 001's bid data. Farmer A and elevator 001 were both notified of the conformance by e-mail that farmer A was willing to sell 10,000 bushels of grain for $1.82/bushel to elevator 001 and deliver the grain to elevator 001 in Decatur in October. Simultaneously, the elevator 001's bid was automatically withdrawn from the view of farmers B, C, and D. Also simultaneously, the elevator 001's hedge was automatically executed to sell a futures contract for 10,000 bushels of grain for $2,24/bushel electronically through a current futures clearing merchant. The net effect was that elevator 001 purchased 10,000 bushels of grain for 1.82/bushel from farmer "A" for a net cost of $18,200 and sold 10,000 bushels of grain at $2.26/bushel (i.e., the hedge futures sell contract) for a gross of $22,600. The difference reflects the basis of $−0.44 or $4,400, which accounts for the elevator's profits and costs.

After purchase of the grain, the grain elevator will likely sell the grain at the local cash price, realize the profit built into his basis, and buy back his futures contract to sell 10,000 bushels of grain at the current futures price. Optimally, the futures price should track the local cash price. Thus, if a sudden fall in the local cash price for grain at the time the elevator sought to sell the grain, he would be hedged by his futures contract.

7. CONCLUSION

From the above description and examples, it is clear that in one embodiment, the invention is directed to a method for purchasing a commodity comprising:

(a) providing bid data for the commodity on a network platform, the bid data provided by a buyer;
(b) providing one or more sell data parcels for the commodity on the network platform, each sell data parcel corresponding to a particular seller;
(c) providing hedge transaction information respecting a listed hedge commodity, the hedge transaction provided by the buyer;
(d) monitoring the bid data and the one or more sell data parcels;
(e) automatically identifying a conforming sell data parcel, which conforms to the bid data; and
(f) automatically executing the buyer's hedge transaction.

In another embodiment, the invention relates to a system for purchasing a commodity comprising:

(i) a memory storage device;
(ii) a processor connected to the storage device;
(iii) a program for controlling the processor; wherein the memory storage device and the processor are operative with the program to:
  (a) provide bid data for the commodity on a network platform, the bid data provided by a buyer;
  (b) provide one or more sell data parcels for the commodity on the network platform, each sell data parcel corresponding to a particular seller;
  (c) provide hedge transaction information respecting a listed hedge commodity, the hedge transaction provided by the buyer;
  (d) monitor the bid data and the one or more sell data parcels;
  (e) automatically identify a conforming sell data parcel, which conforms to the bid data; and
  (f) automatically execute the buyer's hedge transaction.

In still another embodiment, the invention is directed to a computer readable medium encoded with a computer program that causes a system comprising a memory storage device and a processor to perform the steps of:

(a) providing bid data for the commodity on a network platform, the bid data provided by a buyer;
(b) providing one or more sell data parcels for the commodity on the network platform, each sell data parcel corresponding to a particular seller;
(c) providing hedge transaction information respecting a listed hedge commodity, the hedge transaction provided by the buyer;
(d) monitoring the bid data and the one or more sell data parcels;
(e) automatically identifying a conforming sell data parcel, which conforms to the bid data; and
(f) automatically executing the buyer's hedge transaction.

Although the present invention has been described in considerable detail with reference to certain preferred embodiments, versions, and Examples other versions and embodiments are possible. Therefore, the spirit and scope of the appended claims should not be limited to the description of the versions and embodiments expressly disclosed herein.

What is claimed is:

1. A commodity purchasing system, comprising:
a data storage device;
a processor connected to the data storage device;
a plurality of buyer interfaces, recorded on the data storage device, comprising a set of pictures, text or voice statements that provide instructions and protocols that will cause a respective plurality of buyer-operated computers to display to a respective plurality of buyers sell data received from a seller, and to receive from the plurality of buyers hedge transaction data and bid data, said hedge transaction data for each buyer including a hedge commodity, and said bid data for each buyer including a basis for a desired commodity;
a network connection to a commodity exchange that periodically receives a real-time exchange rate quote for the hedge commodity;
a bid generating program, comprising computer-readable instructions to cause the processor to periodically update the bid data for each buyer in the plurality of buyers so that said bid data for said each buyer includes an updated bid price for the desired commodity, wherein said bid generating program calculates said updated bid price by subtracting said each buyer's basis from the real-time exchange rate quote;
a seller interface, recorded on the data storage device, comprising a set of pictures, text or voice statements that provide instructions and protocols that will cause a seller-operated computer to display to the seller the bid data received from the plurality of buyers, and to receive the sell data from the seller, said sell data including a net sell price for the desired commodity and, for each buyer in the plurality of buyers, a transaction cost associated with selling the desired commodity to said each buyer, wherein said transaction cost is based on a cost the seller will incur or avoid in connection with delivering the desired commodity at a time and a location specified by said each buyer;
an offer generating program, comprising computer-readable instructions that cause the processor to periodically update the sell data for the seller so that the sell data includes a plurality of specific offers for the plurality of buyers, respectively, each specific offer including a specific sell price for each buyer, the specific sell price being calculated by adding the transaction cost associated with said each buyer to the net sell price; and
a conformance monitoring program, comprising computer-readable instructions that cause the processor to periodically compare the bid data for each buyer in the plurality of buyers to the specific offer for said each buyer, and send an alert to the seller and a particular buyer in the plurality of buyers if a conformance is detected between the bid data for said particular buyer and the specific offer for said particular buyer;
wherein, the processor, operating under control of the conformance monitoring program, detects the conformance when (i) the updated bid price in the bid data for the particular buyer matches the specific sell price in the specific offer for the particular buyer, (ii) a quality specification in the bid data for said particular buyer matches a quality attribute in the specific offer for the particular buyer, (iii) a type specification in the bid data for said particular buyer matches a type attribute in the specific offer for the particular buyer, and (iv) a color specification in the bid data for said particular buyer matches a color attribute in the specific offer for the particular buyer.

2. The commodity purchasing system of claim 1, wherein the hedge commodity and the desired commodity are the same.

3. The commodity purchasing system of claim 1, wherein the seller interface comprises an interactive web page.

4. The commodity purchasing system of claim 1, wherein the seller interface comprises an e-mail transmittal.

5. The commodity purchasing system of claim 1, wherein the seller interface comprises a voice message.

6. The commodity purchasing system of claim 1, wherein the plurality of buyer interfaces comprises a respective plurality of interactive web pages.

7. The commodity purchasing system of claim 1, wherein the plurality of buyer interfaces comprises a respective plurality of e-mail transmittals.

8. The commodity purchasing system of claim 1, wherein the plurality of buyer interfaces comprises a respective plurality of voice messages.

9. The commodity purchasing system of claim 1, wherein the bid generating program, the offer generating program and the conformance monitoring program are embodied in one computer program.

10. The commodity purchasing system of claim 1, wherein said offer generation program is further configured to cause the processor to remove the plurality of specific offers from the sell data of the seller responsive to the conformance monitoring program causing the processor to send the alert.

11. The commodity purchasing system of claim 1, wherein the alert comprises one or more e-mail messages.

12. The commodity purchasing system of claim 1, wherein the alert is presented to the seller via the seller interface.

13. The commodity purchasing system of claim 1, wherein the alert is presented to the particular buyer via a buyer interface associated with the particular buyer.

14. The commodity purchasing system of claim 1, further comprising:
a plurality of seller interfaces, recorded on the data storage device, each comprising a set of pictures, text or voice statements that provide instructions and protocols that will cause a respective plurality of seller-operated computers to display to a respective plurality of sellers the bid data received from the plurality of buyers, and to receive sell data from the plurality of sellers, said sell data including, for each seller, a net sell price for the desired commodity and, for each buyer in the plurality of buyers, the transaction cost associated with selling the desired commodity to said each buyer;
wherein
the offer generating program further comprises computer-readable instructions that cause the processor to periodically update the sell data for the plurality of sellers so that the sell data includes, for each seller, a plurality of specific offers for the plurality of buyers, respectively, each specific offer including the specific sell price for each buyer, the specific sell price being calculated by adding the transaction cost associated with said each buyer to the net sell price, and
the conformance monitoring program further comprises computer-readable instructions that cause the processor to periodically compare the bid data for each buyer in the plurality of buyers to the specific offer for said each buyer from each seller, and sends an alert to a particular seller in the plurality of sellers and a particular buyer in the plurality of buyers if a conformance is detected between the bid data for said particular buyer and the particular seller's specific offer for said particular buyer.

15. A commodity purchasing system, comprising:
a web page server;
a central processor;
a commodity-purchasing software program, residing on the web page server;
a plurality of buyer interface web pages on the web page server configured to cause a respective plurality of buyer-operated computers to display to a respective plurality of buyers sell data received from a seller, and to transmit to the central processor hedge transaction data and bid data received from the plurality of buyers, said hedge transaction data for each buyer including a hedge commodity, and said bid data for each buyer including a basis for a desired commodity;
a seller interface web page on the web page server configured to cause a seller-operated computer to display to the seller the bid data received from the plurality of buyers, and to transmit to the central processor sell data received from the seller, said sell data including a net sell price for the desired commodity and, for each buyer in the plurality of buyers, a transaction cost associated with selling the desired commodity to said each buyer, wherein said transaction cost is based on a cost the seller will incur or avoid in connection with delivering the desired commodity at a time and a location specified by said each buyer;
and
a commodity exchange network connection that periodically delivers to the central processor a real-time exchange rate quote for the hedge commodity;
wherein the commodity-purchasing software program comprises a set of computer-readable instructions to cause the central processor and web page server to
transmit the plurality of buyer interface web pages to the plurality of buyer-operated computers and to transmit the seller interface web page to the seller-operated computer,
periodically update the bid data presented by the seller interface web page so that said bid data includes an updated bid price for the desired commodity for each buyer in the plurality of buyers, said updated bid price being calculated by subtracting said each buyer's basis from the real-time exchange rate quote,
periodically update the sell data presented by the plurality of buyer interface web pages so that the sell data for the seller includes a specific offer for each buyer in the plurality of buyers, each specific offer including a specific sell price for said each buyer, wherein the commodity-purchasing software program calculates the specific sell price for said each buyer by adding the transaction cost associated with said each buyer to the net sell price, and
periodically compare the bid data for each buyer in the plurality of buyers to the specific offer for said each buyer, and send an alert to the seller and a particular buyer in the plurality of buyers if a conformance is detected between the bid data for said particular buyer and the specific offer for said particular buyer;
wherein, the commodity-purchasing software program is configured to cause the central processor to detect the conformance when (i) the updated bid price in the bid data for the particular buyer matches the specific sell price in the specific offer for the particular buyer, (ii) a quality specification in the bid data for said particular buyer matches a quality attribute in the specific offer for the particular buyer, (iii) a type specification in the bid data for said particular buyer matches a type attribute in the specific offer for the particular buyer, and (iv) a color specification in the bid data for said particular buyer matches a color attribute in the specific offer for the particular buyer.

16. The commodity purchasing system of claim 15, wherein the hedge commodity and the desired commodity are the same.

17. The commodity purchasing system of claim 15, wherein, responsive to the alert, the commodity-purchasing software program is further configured to cause the central processor and the web page server to remove the plurality of specific offers from the sell data displayed by the plurality of buyer interface web pages.

18. The commodity purchasing system of claim 15, wherein the alert is presented to the seller via the seller interface web page.

19. The commodity purchasing system of claim 15, wherein the alert is presented to the particular buyer via a buyer interface web page transmitted to the particular buyer.

20. The commodity purchasing system of claim 15, further comprising:
a plurality of seller interface web pages on the web server configured to cause a respective plurality of seller-operated computers to display to a respective plurality of sellers the bid data received from the plurality of buyers, and to transmit to the central processor sell data received from the plurality of sellers, said sell data including, for each seller, a net sell price for the desired commodity and, for each buyer in the plurality of buyers, a transaction cost associated with selling the desired commodity to said each buyer;
wherein the commodity-purchasing software program is further configured to cause the central processor and the web page server to
periodically update the bid data presented by each seller interface web page so that said bid data includes an updated bid price for the desired commodity for each buyer in the plurality of buyers, wherein said updated bid price is calculated by subtracting said each buyer's basis from the real-time exchange rate quote,
periodically update the sell data presented by the plurality of buyer interface web pages so that the sell data on each buyer interface web page includes a plurality of specific offers from said plurality of sellers, each specific offer including a specific sell price for said each buyer, wherein the specific sell price for said each buyer is calculated by adding the transaction cost associated with said each buyer to the net sell price, and
periodically compare the bid data received from each buyer in the plurality of buyers to the specific offer for said each buyer received from the plurality of sellers, and send an alert to a particular seller in the plurality of sellers and a particular buyer in the plurality of buyers if a conformance is detected between the bid data for said particular buyer and the particular seller's specific offer for said particular buyer.

21. A method for purchasing commodities on a computer system comprising a central processor, a web page server and a network connection to a commodities exchange, the method comprising:
using the web page server and the central processor to transmit to a plurality of buyer-operated computers a respective plurality of buyer web pages for a respective plurality of buyers, each buyer web page being configured to cause the buyer-operated computer to display sell data received from a seller and to receive from the plurality of buyers hedge transaction data and bid data, said hedge transaction data for each buyer including a hedge commodity, and said bid data for each buyer including a basis for a desired commodity;

periodically receiving on the central processor, via the network connection to the commodities exchange, a real-time exchange rate quote for the hedge commodity;

using the web page server and the central processor to periodically update the bid data for each buyer in the plurality of buyers so that said bid data for said each buyer includes an updated bid price for the desired commodity, wherein said central processor calculates the updated bid price by subtracting said each buyer's basis from the real-time exchange rate quote;

using the web page server and the central processor to transmit to a seller-operated computer a seller web page configured to cause the seller-operated computer to display the bid data received from the plurality of buyers and to receive from the seller the sell data, said sell data including a net sell price for the desired commodity and, for each buyer in the plurality of buyers, a transaction cost associated with selling the desired commodity to said each buyer, wherein said transaction cost is based on a cost the seller will incur or avoid in connection with delivering the desired commodity at a time and a location specified by said each buyer;

using the central processor to periodically update the sell data for the seller so that the sell data includes a plurality of specific offers for the plurality of buyers, respectively, each specific offer including a specific sell price for each buyer, wherein the central processor calculates the specific sell price by adding the transaction cost associated with said each buyer to the net sell price; and using the central processor to periodically compare the bid data for each buyer in the plurality of buyers to the specific offer for said each buyer to determine whether a conformance exists between the bid data for a particular buyer in the plurality of buyers and the specific offer for said particular buyer; and if a conformance exists, causing the central processor to send an electronic alert to the seller-operated computer and the buyer-operated computer for the particular buyer;

wherein, the central processor is configured to determine that the conformance exist when (i) the updated bid price in the bid data for the particular buyer matches the specific sell price in the specific offer for the particular buyer, (ii) a quality specification in the bid data for said particular buyer matches a quality attribute in the specific offer for the particular buyer, (iii) a type specification in the bid data for said particular buyer matches a type attribute in the specific offer for the particular buyer, and (iv) a color specification in the bid data for said particular buyer matches a color attribute in the specific offer for the particular buyer.

22. The method of claim 21, wherein the hedge commodity and the desired commodity are the same.

23. The method of claim 21, further comprising using the web page server to remove the plurality of specific offers from the sell data of the seller upon sending the electronic alert.

24. The method of claim 21, wherein sending the electronic alert comprises sending one or more e-mail messages.

25. The method of claim 21, wherein sending the electronic alert to the seller comprises sending a notification to the seller via the seller interface.

26. The method of claim 21, wherein sending the electronic alert to the buyer-operated computer comprises modifying the buyer web page displayed on the buyer-operated computer.

27. The method of claim 21, further comprising:

using the web page server and the central processor to transmit a plurality of seller web pages to a respective plurality of seller-operated computers, each seller web page being configured to cause each seller-operated computer to display the bid data received from the plurality of buyers, and to receive sell data from a plurality of sellers, said sell data including, for each seller, a net sell price for the desired commodity and, for each buyer in the plurality of buyers, a transaction cost associated with selling the desired commodity to said each buyer;

using the web page server and the central processor to periodically update the sell data for the plurality of sellers so that the sell data includes, for each seller, a plurality of specific offers for the plurality of buyers, respectively, each specific offer including a specific sell price for each buyer, wherein the specific sell price is calculated by the central processor by adding the transaction cost associated with said each buyer to the net sell price;

using the central processor to periodically compare the bid data for each buyer in the plurality of buyers to the specific offer for said each buyer from each seller in the plurality of sellers to determine if a conformance exists between the bid data for said particular buyer and a particular seller's specific offer for said particular buyer; and using the central processor to send an electronic alert to the seller-operated computer for the particular seller in the plurality of sellers and the buyer-operated computer for a particular buyer in the plurality of buyers if the central processor determines that said conformance exists.

* * * * *